May 11, 1926.
H. W. DRAKE
1,584,684
DUPLEX SYSTEM OF TELEGRAPHY
Filed July 23, 1924
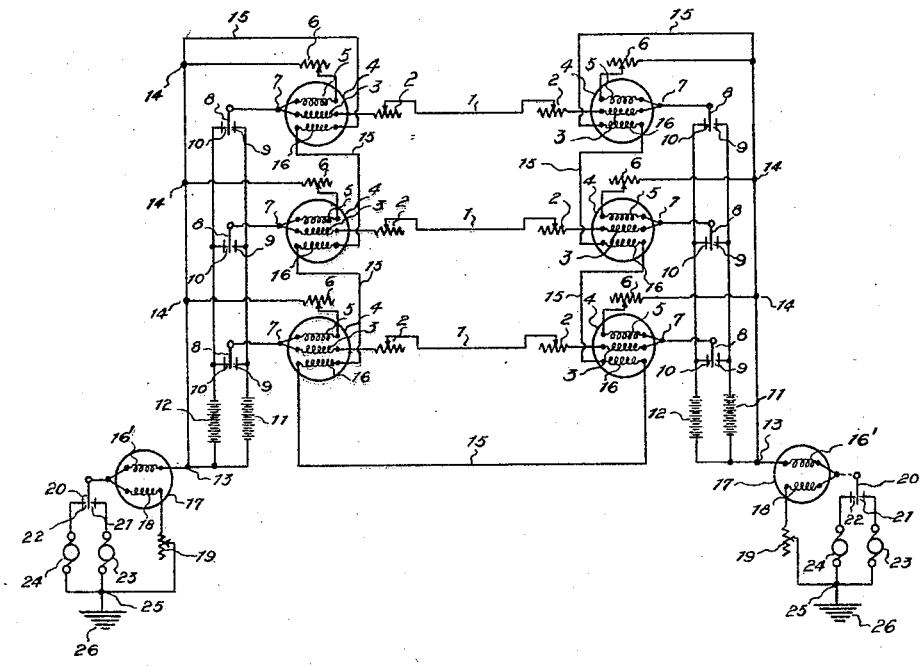
Inventor
H. W. Drake
By Eugene C. Brown
Attorney Patented May 11, 1926.

1,584,684

UNITED STATES PATENT OFFICE.

HERBERT W. DRAKE, OF EAST ORANGE, NEW JERSEY, ASSIGNOR TO THE WESTERN UNION TELEGRAPH COMPANY, OF NEW YORK, N. Y., A CORPORATION OF NEW YORK.

DUPLEX SYSTEM OF TELEGRAPHY.

Application filed July 23, 1924. Serial No. 727,765.

The present invention relates to duplex systems of telegraphy.

As commonly used, duplex systems of the prior art utilize a single line conductor together with a ground return circuit, and a balancing artificial line at each terminal station in which an effort is made to duplicate the electrical characteristics of the line circuit in order that a perfect balance, so far as possible, may be established. Owing to the external disturbances which affect the line circuit, and the ground potential variations at the grounded terminals, the extraneous currents flowing in such lines are at times of such magnitude as to prevent the practical operation of the circuits. The ground currents become particularly troublesome during the occurrence of the aurora borealis and other atmospheric electrical disturbances, so that in certain installations the ground return must be replaced by a metallic return circuit. When this substitution is made, however, the disturbances induced in the line by induction still occur, but usually are reduced in magnitude.

In copending applications, Serial No. 726,868, filed July 18, 1924, and Serial No. 727,749, filed July 23, 1924, plural metallic duplex systems are provided in which return conductors common to all of the lines are utilized. In such systems the advantages of metallic circuit operation over a plurality of lines is attained with a minimum number of conductors. It has been found possible to retain all of the advantages of the systems disclosed in the copending applications, and at the same time to provide an additional superposed duplex grounded circuit without the addition of any extra line conductors. Each of the metallic circuits and the superposed circuit will perform its functions without interference by the remaining circuits.

An object of the invention accordingly is the provision of a duplex system of telegraphy in which a grounded circuit is superposed upon one or more metallic circuits in a manner to provide as many duplex circuits as there are line conductors.

A further object of the invention is the provision of a system of telegraphy in which a maximum of metallic duplex circuits, and a grounded duplex circuit are provided over a minimum number of line conductors.

Other objects will appear in the following detailed description of preferred embodiments of the invention of which—

The drawing shows a circuit diagram for one form.

A plurality of main lines 1, are connected in series with adjustable resistances 2, and windings 3 of receiving relays 4. Each relay 4, is provided with a winding 5, connected in series with one terminal of artificial lines 6. The free terminals of windings 3, and 5 are connected to junction points 7 which in turn are connected to pole changing keys or tongues 8 of any well known single contact form of transmitter. Tongues 8 are actuated to engage contacts 9 and 10 and to apply positive and negative potentials to the respective lines 1 from batteries 11 and 12 in accordance with the signals to be transmitted to the lines. The free terminals of batteries 11 and 12 are connected at points 13, and artificial lines 6 are connected at points 14 to a metallic return conductor 15 which passes in series through windings 16 of all the relays 4.

Connected to points 13 at each end of the network are main line windings 16' of any common form of polarized differential duplex receiving relays 17. Artificial line windings 18 of relays 17 are connected at one terminal to artificial lines 19. The other terminals of windings 16' and 18 are connected to pole changing tongues 20 of any suitable transmitter. Tongues 20 are actuated between contacts 21 and 22 to complete circuits from ground 26, point 25, through generators 23 and 24, or other sources of electrical energy and out over the network in accordance with the signals to be transmitted. Artificial lines 19 are connected to points 25.

The windings 3 and 5 are arranged so that transmitted currents passing outward from points 7 over windings 3 to lines 1 will set up magnetomotive forces which will be opposed by the magnetomotive forces set up by the currents passing outward from points 7 through windings 5 and artificial lines 6, while incoming currents will pass around windings 3 and 5 in a well known manner to cause the magnetomotive forces caused thereby to add. The constants of artificial lines 6 are proportional but not equal to the main line constants, so that more current will pass through windings 5 than will pass through windings 3 with a result that the magnetic forces developed by transmitted currents in these windings will not balance. The windings 16 on relays 4 are, however, so proportioned and arranged that the magnetic effect thereof due to the returning currents, will be added to the magnetic effect of windings 3 in a manner to balance the magnetic effects of the transmitted impulses. It will be noted that for the received impulses, the direction of current in windings 3, 5 and 16 are such that the magnetomotive forces are added, and the result is an increased pull on the receiving relay over and above that which may be obtained using ordinary two coil differential relays.

It will be apparent that a plurality of metallic return paths independently of the superposed grounded circuits are provided in this arrangement with the addition of only one extra line, and for this reason, for the same values of applied potential higher operating currents are available than in single metallic duplex systems. For two duplex circuits on three line conductors a ratio of main circuit to artificial circuit constants of 3:2 will give excellent results; for three circuits on four conductors a ratio of 4:3 may be used; for four circuits on five conductors the ratio may be 5:4 and so on, but it will be understood that these values may be varied within wide limits and the proportions of the relay windings may be varied accordingly.

The superposed grounded circuit will function in the usual manner. Transmitted currents will pass out over tongues 20 and will divide part passing through coils 18 and the artificial line circuits, and part passing through coils 16, over the various paths in the network between the stations then in series through the coils 16' and 18 at the receiving station to ground. The arrangement is such that the coils 16' and 18 balance for transmitted currents, and it is found in practice that the division of currents in the network due to the operation of the superposed circuit and ground currents in the superposed circuit do not interfere with the operation of the metallic duplex circuits.

Although differential duplex arrangements have been disclosed it will be understood that the superposed circuit may be a bridge duplex, and the superposed circuit may be applied to any of the plural metallic duplex arrangements shown in the copending applications.

Having disclosed preferred embodiments of the invention what is desired to be secured by Letters Patent and claimed as new is:

1. A telegraph system comprising a complete metallic duplex circuit, and a grounded duplex circuit superposed upon said metallic duplex circuit.

2. A telegraph system comprising a plurality of duplexed main line circuits, a common metallic return for said main line circuits, and an independent duplex circuit superposed upon said main line and said common return circuits.

3. The system as set forth in claim 2 in which said independent duplex circuit comprises a ground return.

4. A telegraph system comprising a plurality of main line conductors, artificial lines individual to said main line conductors, a common return circuit for said main line conductors, electro-responsive receiving means individual to each of said main line circuits, a winding individual to each of said receiving means connected in said return circuit, and a grounded duplex circuit superposed upon said main lines and said return circuit.

In testimony wheerof I affix my signature.

HERBERT W. DRAKE.